(12) United States Patent
Park

(10) Patent No.: US 7,801,528 B2
(45) Date of Patent: Sep. 21, 2010

(54) METHOD OF CHANGING STANDBY ORDER OF WAITING MOBILE TERMINALS IN MOBILE TERMINAL

(75) Inventor: Jae-Wan Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 11/769,201

(22) Filed: Jun. 27, 2007

(65) Prior Publication Data

US 2008/0171563 A1    Jul. 17, 2008

(30) Foreign Application Priority Data

Jan. 16, 2007    (KR) ...................... 10-2007-0004601

(51) Int. Cl.
H04W 4/00    (2009.01)
(52) U.S. Cl. ................. 455/435.1; 455/414.1; 455/466; 455/517
(58) Field of Classification Search ............. 455/422.1, 455/435.1, 466, 67.1, 412.1, 437, 445, 574
See application file for complete search history.

(56) References Cited

U.S. PATENT DOCUMENTS

2002/0009987 A1* 1/2002 Tobita et al. ................. 455/414
2003/0104830 A1* 6/2003 Norwood et al. ............. 455/517
2006/0223593 A1* 10/2006 Ishak ......................... 455/574
2008/0132254 A1* 6/2008 Graham et al. .............. 455/466

FOREIGN PATENT DOCUMENTS

| KR | 1020000042764 | 7/2000 |
| KR | 1020050017736 | 2/2005 |
| KR | 1020050053912 | 6/2005 |
| KR | 1020070012088 | 1/2007 |

* cited by examiner

Primary Examiner—Kent Chang
Assistant Examiner—Dinh P Nguyen
(74) Attorney, Agent, or Firm—H.C. Park & Associates, PLC

(57) ABSTRACT

A method for changing a standby order of waiting mobile terminals includes displaying a standby order of a plurality of mobile terminals according to an audiovisual communication request order when a first mobile terminal receives requests for audiovisual communication from the plurality of mobile terminals while the first mobile terminal performs audiovisual communication with a second mobile terminal, sending a standby order change request message from the first mobile terminal to a mobile communication network when the first mobile terminal receives a standby order change request, changing the standby order at the first mobile terminal when the first mobile terminal receives a standby order change completion message from the mobile communication network corresponding to the standby order change request message, and displaying the changed standby order.

17 Claims, 9 Drawing Sheets

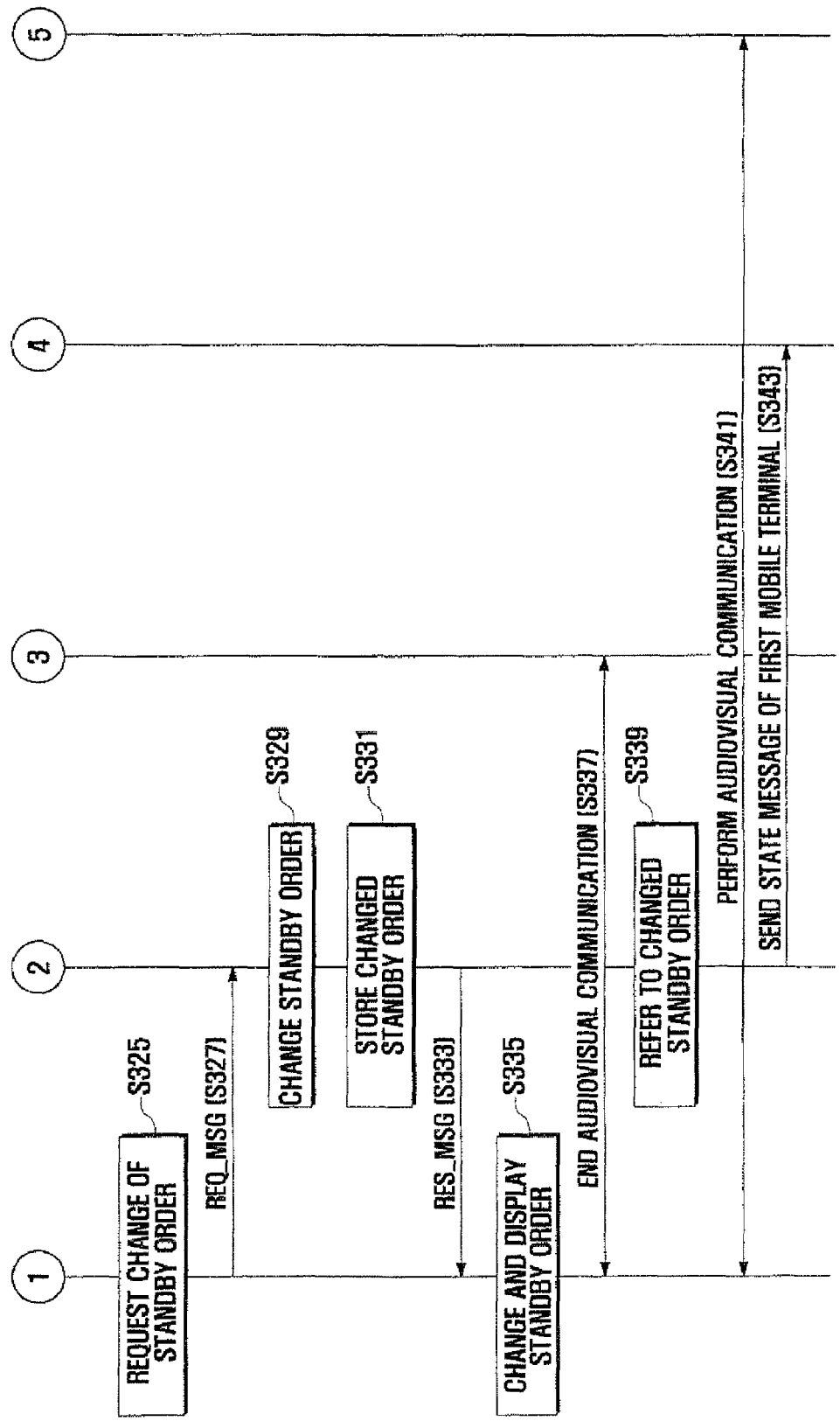

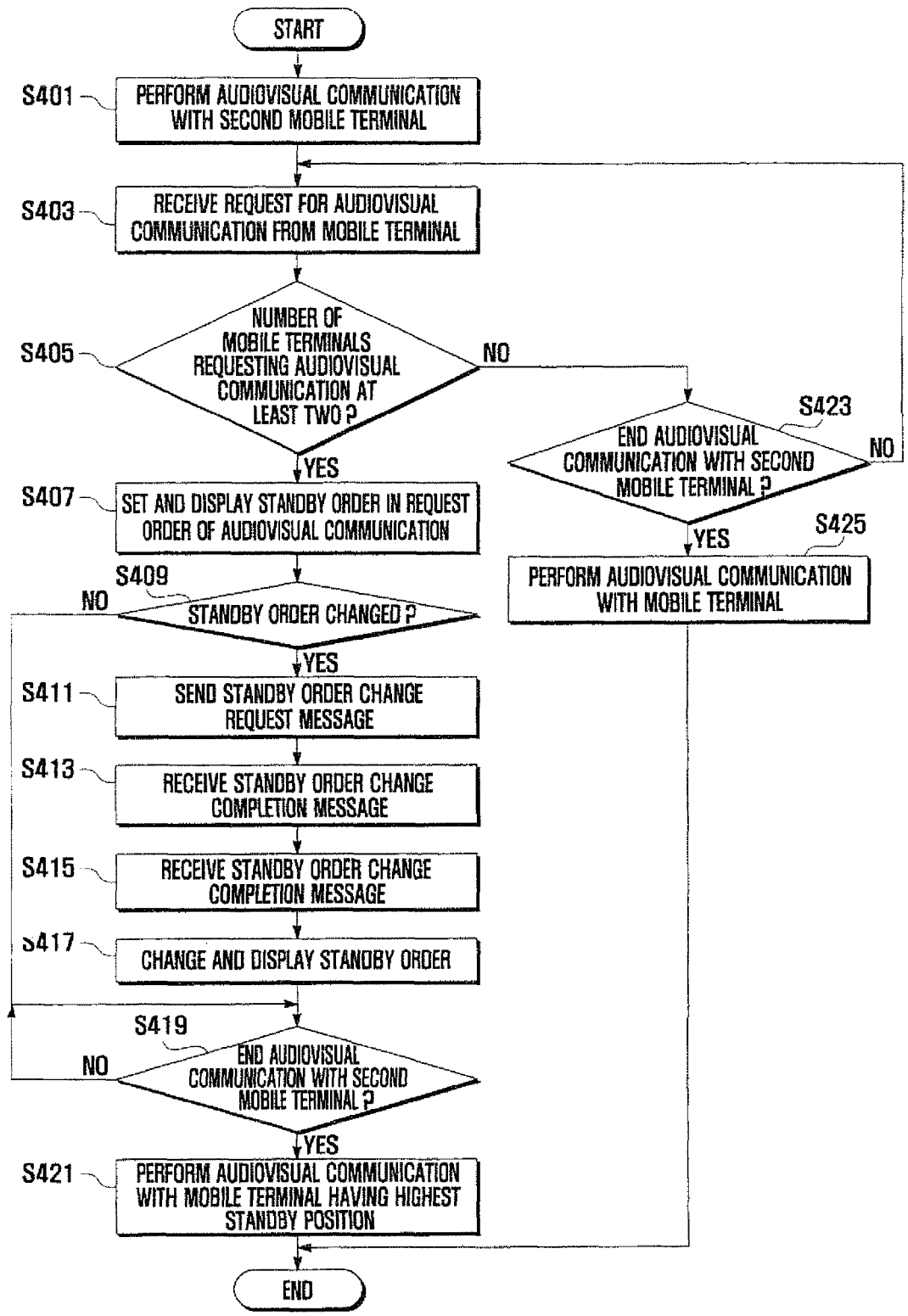

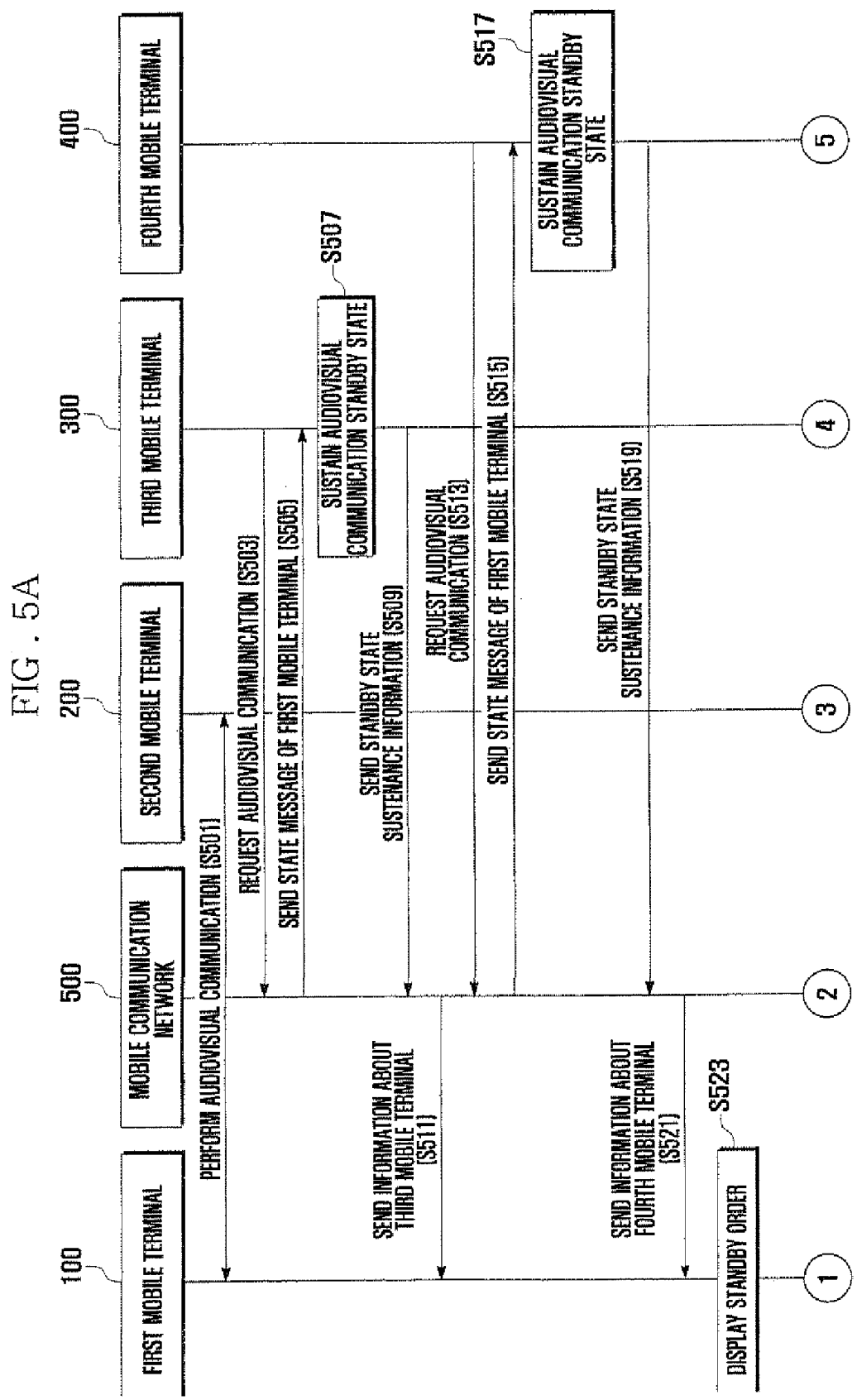

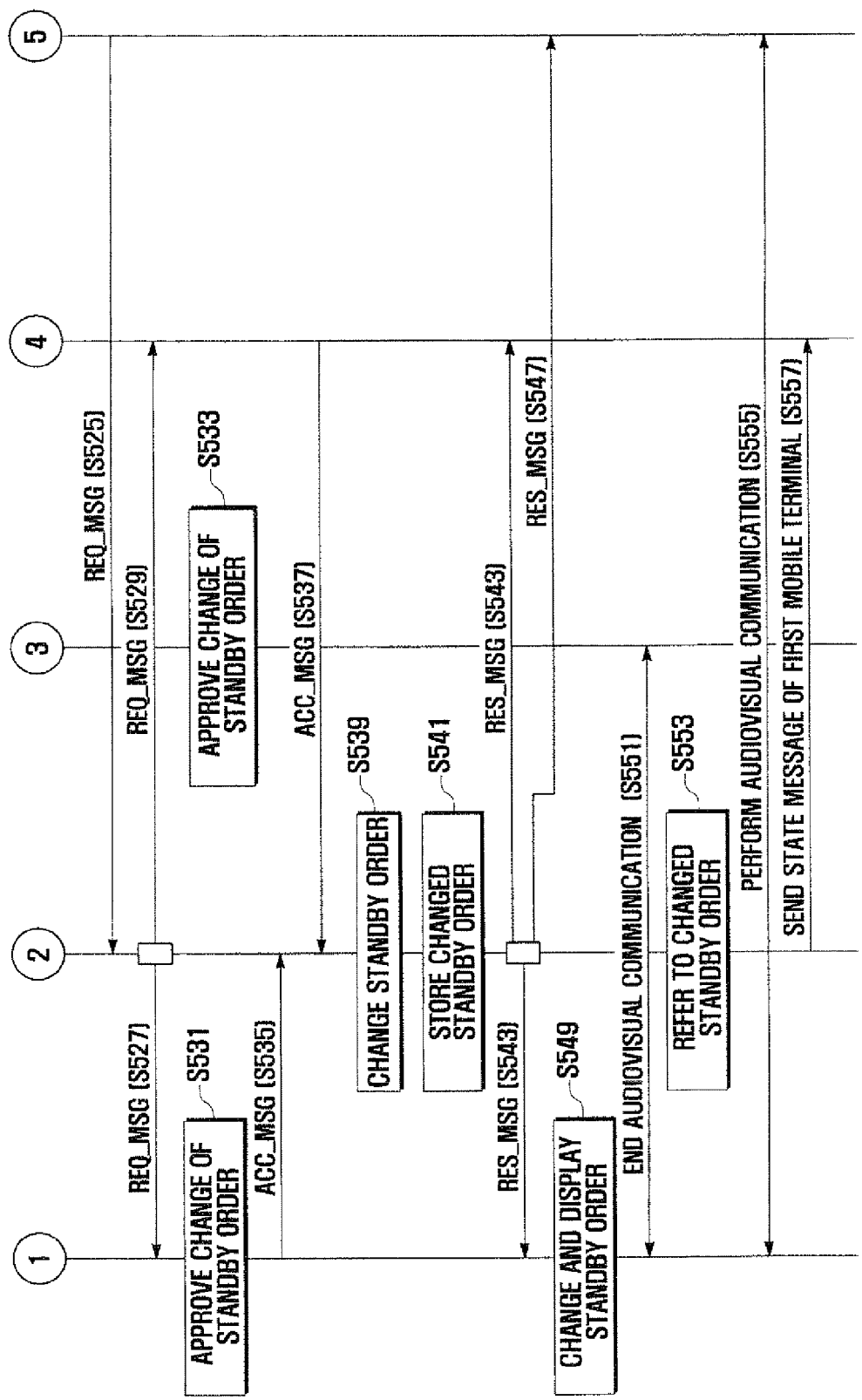

US 7,801,528 B2

METHOD OF CHANGING STANDBY ORDER OF WAITING MOBILE TERMINALS IN MOBILE TERMINAL

CROSS REFERENCE TO RELATED APPLICATION

This application claims priority from and the benefit of Korean Patent Application No. 10-2007-0004601, filed on Jan. 16, 2007, which is hereby incorporated by reference for all purposes as if fully set forth herein.

BACKGROUND OF THE INVENTION

1. Field of the Invention

The present invention relates to a method of providing an audiovisual communication service in a mobile terminal, and more particularly, to a method of changing a standby order of waiting mobile terminals in a mobile terminal.

2. Discussion of the Background

As technology of mobile terminals has developed, an improved mobile terminal having a camera unit using an H.324M protocol including an H.245 protocol that allows for audiovisual communication has been provided.

In conventional audiovisual communication technology, when a first mobile terminal receives a request for audiovisual communication from a third mobile terminal while the first mobile terminal is performing audiovisual communication with a second mobile terminal, the first mobile terminal stores information about the third mobile terminal. Thereafter, when the first mobile terminal ends audiovisual communication with the second mobile terminal, the first mobile terminal displays information about the third mobile terminal and performs audiovisual communication with the third mobile terminal.

However, in the conventional audiovisual communication technology, even when the third mobile terminal urgently requests audiovisual communication with the first mobile terminal, the third mobile terminal may have to wait until the first mobile terminal ends audiovisual communication with the second mobile terminal.

SUMMARY OF THE INVENTION

The present invention provides a method of changing a standby order of at least two mobile terminals requesting audiovisual communication while a first mobile terminal is performing audiovisual communication.

The present invention further provides a method of changing a standby order of mobile terminals in a standby state according to a standby order change request received from one of at least two mobile terminals waiting for audiovisual communication with the first mobile terminal while the first mobile terminal is performing audiovisual communication.

The present invention further provides a method of displaying information about a mobile terminal requesting audiovisual communication while a first mobile terminal is performing audiovisual communication with a second mobile terminal.

Additional features of the invention will be set forth in the description which follow, and in part will be apparent from the description, or may be learned by practice of the invention.

The present invention discloses a method for changing a standby order in a mobile communication system including displaying a standby order of a plurality of mobile terminals, according to the order in which audiovisual communication requests of the plurality of mobile terminals were received, when a first mobile terminal receives requests audiovisual communication from the plurality of mobile terminals while the first mobile terminal is performing audiovisual communication with a second mobile terminal, sending a standby order change request message to a mobile communication network from the first mobile terminal when the first mobile terminal receives a request to change the standby order, changing the standby order at the first mobile terminal when the first mobile terminal receives a standby order change completion message corresponding to the standby order change request message, and displaying the changed standby order.

The present invention also discloses a method for changing a standby order in a mobile communication system including displaying a standby order of a plurality of mobile terminals, according to the order in which audiovisual communication requests of the plurality of mobile terminals were received, when a first mobile terminal receives requests for audiovisual communication from the plurality of mobile terminals while the first mobile terminal is performing audiovisual communication with a second mobile terminal, determining whether the first mobile terminal approves a requested change of the standby order when the first mobile terminal receives a standby order change request message of a third mobile terminal of the plurality of mobile terminals, changing the standby order if the first mobile terminal approves the requested change of the standby order, and displaying the changed standby order.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 3A and 3B are message flow diagrams showing a method of changing a standby order of waiting mobile terminals in a mobile terminal according to another exemplary embodiment of the present invention.

FIG. 4 is a flowchart showing a method of changing a standby order of waiting mobile terminals in a mobile terminal according to another exemplary embodiment of the present invention.

FIGS. 5A and 5B are message flow diagrams showing another method of changing a standby order of waiting mobile terminals in a mobile terminal according to another exemplary embodiment of the present invention.

DETAILED DESCRIPTION OF THE ILLUSTRATED EMBODIMENTS

Figure 1:
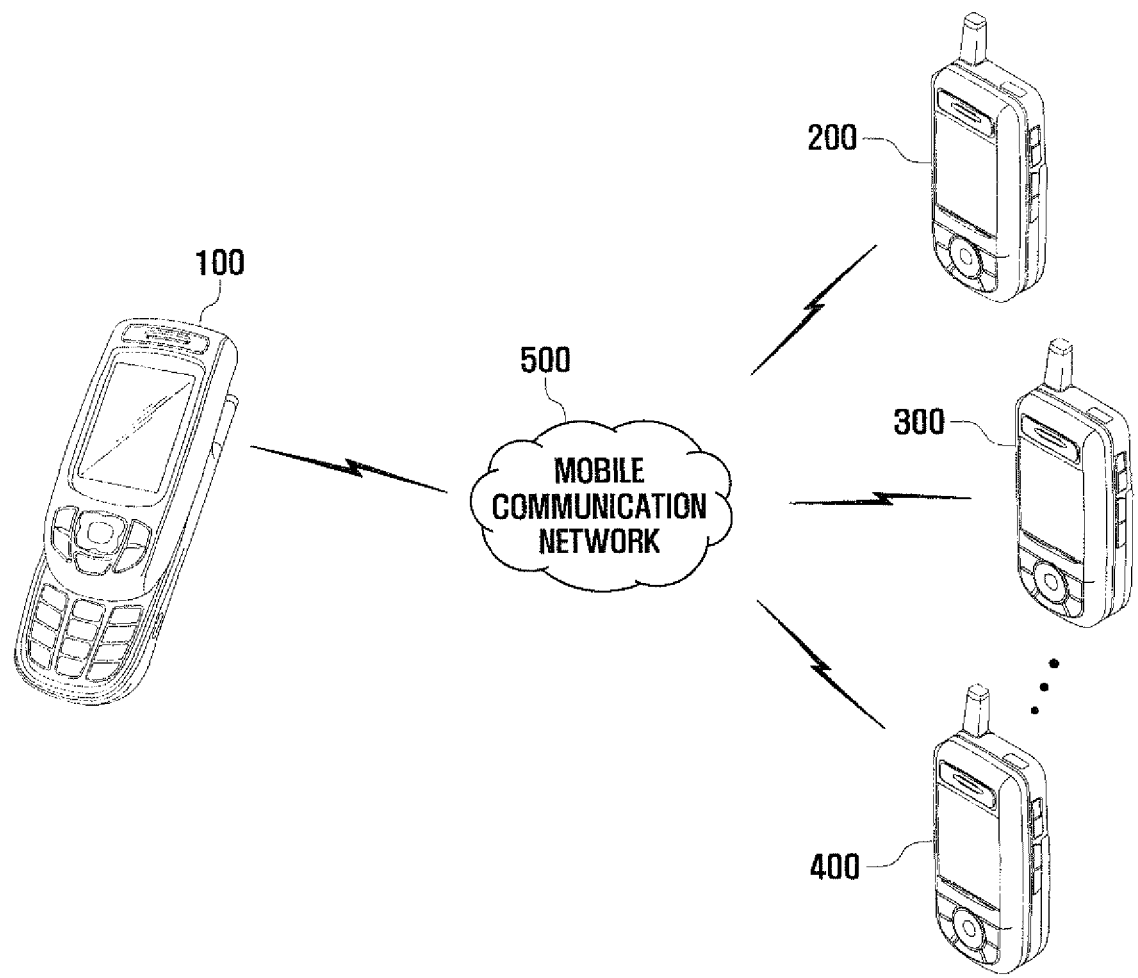
FIG. 1 is a diagram showing a system for providing an audiovisual communication service to mobile terminals according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Exemplary embodiments according to the present invention exemplify a mobile terminal that includes a camera unit and is capable of performing audiovisual communication. That is, a mobile terminal according to exemplary embodiments of the present invention may include an information communication device or multimedia device, such as a mobile communication terminal, a mobile phone, a Personal Digital Assistant (PDA), a smart phone, or a notebook computer, that includes a camera unit and is capable of performing audiovisual communication, and applications thereof.

Exemplary embodiments according to the present invention exemplify audiovisual communication. However, the present exemplary embodiments are not limited to audiovisual communication and may be applied to voice communication.

FIG. 1 is a diagram showing a system for providing an audiovisual communication service to mobile terminals according to an exemplary embodiment of the present invention.

Referring to FIG. 1, the system includes a first mobile terminal 100, a second mobile terminal 200, a third mobile terminal 300, a fourth mobile terminal 400, and a mobile communication network 500.

The first mobile terminal may perform audiovisual communication with the second mobile terminal 200 and may receive a request for audiovisual communication from the third mobile terminal 300 and the fourth mobile terminal 400 while performing audiovisual communication with the second mobile terminal 200. A configuration of the first mobile terminal 100 is described with reference to FIG. 2, and the same configuration may also be applied to the second mobile terminal 200, the third mobile terminal 300, and the fourth mobile terminal 400 and thus, individual descriptions thereof are omitted.

The mobile communication network 500 includes a node to perform the function of a base station, a radio access network (RAN), which is a sub system of the node, a mobile switching center (MSC)/visitor location register (VLR) corresponding to a core network of a circuit switched domain, a home location register (HLR), and a gateway MSC.

The MSC manages call control and mobility of the first mobile terminal 100, and the VLR and the HLR make up a matching device of subscriber information and register and manage information about mobile terminals belonging to the mobile communication network 500 including the first mobile terminal 100.

In the following description, the first mobile terminal 100, the second mobile terminal 200, the third mobile terminal 300, and the fourth mobile terminal 400 belong to the same mobile communication network 500. However the first mobile terminal 100, the second mobile terminal 200, the third mobile terminal 300, and the fourth mobile terminal 400 may belong to different mobile communication networks and may be connected through different gateway MSCs. However, it is assumed that a series of processes performed in the RAN, MSC/VLR, HLR, and gateway MSC are performed in the mobile communication network 500.

Figure 2:
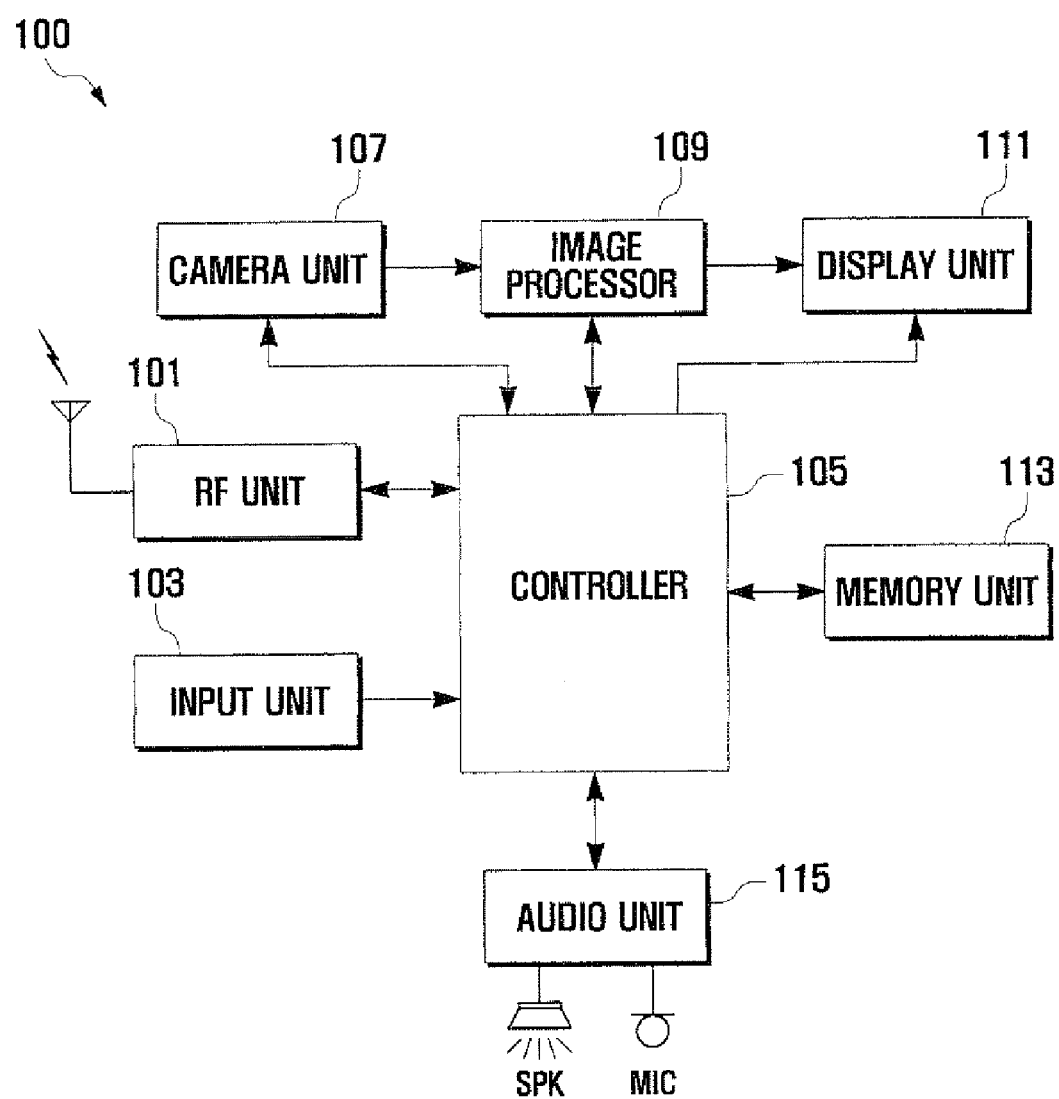
FIG. 2 is a block diagram showing a configuration of a mobile terminal according to another exemplary embodiment of the present invention.

FIG. 2 is a block diagram showing a configuration of a mobile terminal according to another exemplary embodiment of the present invention.

Referring to FIG. 2, the mobile terminal 100 includes a radio frequency (RF) unit 101, an input unit 103, a controller 105, a camera unit 107, an image processor 109, a display unit 111, a memory unit 113, and an audio unit 115.

The RF unit 101 performs general wireless communication with the second mobile terminal 200, the third mobile terminal 300, the fourth mobile terminal 400, and the mobile communication network 500. For example, the RF unit 101 transmits and receives voice data, character messages, and multimedia messages using the mobile communication network 500. The RF unit 101 sends image data acquired from the camera unit 107 of the first mobile terminal 100 to the second mobile terminal 200 when the first mobile terminal 100 performs audiovisual communication with the second mobile terminal 200. The RF unit 101 further receives image data acquired by the camera unit of the second mobile terminal 200 and image data acquired by the camera units of the third mobile terminal 300 and the fourth mobile terminal 400 requesting audiovisual communication. The image data of the second mobile terminal 200 may be still and/or moving picture data, and the image data of the third mobile terminal 300 and the fourth mobile terminal 400 may be still and/or moving image data. Further, when the third mobile terminal 300 and the fourth mobile terminal 400 perform audiovisual communication with the first mobile terminal 100, the image data of the third mobile terminal 300 and the fourth mobile terminal 400 may change to moving picture data.

The input unit 103 may include a general keypad. The input unit 103 may include a touch screen, a touch pad, and a scroll wheel. The input unit 103 receives a user manipulation signal to control operation of the first mobile terminal 100 and provides the manipulation signal to the controller 105.

The controller 105 controls the general operation of the first mobile terminal 100. Particularly, the controller 105 controls the RF unit 101 to perform audiovisual communication with the second mobile terminal 200, receives a request for audiovisual communication from the third mobile terminal 300 and the fourth mobile terminal 400, and sets a standby order of audiovisual communication requests. The controller 105 displays image data (namely, image data of a user of the second mobile terminal 200) of the second mobile terminal 200 performing audiovisual communication in the display unit 111. The controller 105 displays image data from each mobile terminal requesting audiovisual communication, in the order in which the audiovisual communication requests were received, on the display unit 111 of the first terminal 100.

In more detail, the image data of the third mobile terminal 300 and the fourth mobile terminal 400 may be image data mapped to the corresponding mobile terminal and stored in a phone book (not shown) of the first mobile terminal 100. The image data may also be image data acquired by camera units of the third mobile terminal 300 and the fourth mobile terminal 400 when requesting audiovisual communication and may be sent with the request for audiovisual communication. The controller 105 may display the image data of the third mobile terminal 300 and the fourth mobile terminal 400 with thumb-nail type still image data. The controller 105 may also display image data of the second mobile terminal 200, with which the first mobile terminal 100 is performing audiovisual communication, including moving picture data.

The controller 105 sends a standby order change request message REQ_MSG from the first mobile terminal 100 to the mobile communication network 500 through the RF unit 101, receives a standby order change completion message RES_MSG from the mobile communication network 500 through the RF unit 101, changes the standby order of the third mobile terminal 300 and the fourth mobile terminal 400, and displays the changed standby order in the display unit 111.

The controller 105 further receives a standby order change request message REQ_MSG from the mobile terminal having the highest standby position through the mobile communication network 500 and sends a standby order change approval message ACC_MSG to the mobile communication network 500 through the RF unit 101. Thereafter, the controller 105 receives a standby order change completion message RES_MSG from the mobile communication network 500 through the RF unit 101, changes the standby order of the third mobile terminal 300 and the fourth mobile terminal 400, and displays the standby order in the display unit 111.

When the controller 105 determines that the first mobile terminal 100 has ended audiovisual communication with the second mobile terminal 200 or converted a state of audiovisual communication with the second mobile terminal 200 to a standby state, the controller 105 controls the RF unit 101 to perform audiovisual communication with the mobile terminal having the highest standby position. In the exemplary embodiments, to "end" the audiovisual communication is to terminate a communication channel formed to perform audiovisual communication with the second mobile terminal 200, and to "convert" an audiovisual communication state to a standby state is to convert to a standby state in order to perform audiovisual communication with another mobile terminal while maintaining the communication channel formed to perform audiovisual communication with the second mobile terminal 200.

The camera unit 107 generates a user's image data to send through the RF unit 101. The camera unit 107 includes an image sensor to convert a photo signal of a subject to an analog signal and a signal processor to convert the analog signal to a digital signal. That is, the camera unit 107 converts a photo signal collected through a lens to a digital signal and generates image data with the converted digital signal.

The image processor 109 processes image data generated in the camera unit 107 and image data received through the RF unit 101 into a format corresponding to the display unit 111.

The controller 105 controls the display unit 111 to display various operation states, operation results, and other information from the units of the first mobile terminal 100. The display unit 111 may include a display device such as a liquid crystal display (LCD), organic light emitting diodes (OLED), or a plasma display panel (PDP).

The display unit 111 displays image data input through the RF unit 101 and the camera unit 107 and processed in the image processor 109 in real time, thereby performing audiovisual communication or displaying a photographed image.

The memory unit 113 stores information (for example, information about a setting state and a menu) related to operation of a program allowing the controller 105 to control the first mobile terminal 100. The memory unit 113 stores the standby order of the third mobile terminal 300 and the fourth mobile terminal 400. The memory unit 113 stores image data received from the second mobile terminal 200, the third mobile terminal 300, and the fourth mobile terminal 400, and may also store image data mapped to a corresponding terminal in a phone book (not shown) of the first mobile terminal 100.

The audio unit 115 converts an analog audio signal that is input through a microphone MIC to a digital signal, provides the digital signal to the controller 105, converts a digital audio signal that is output from the controller 105 into an analog audio signal, and reproduces the analog audio signal through a speaker SPK.

Figure 3A:
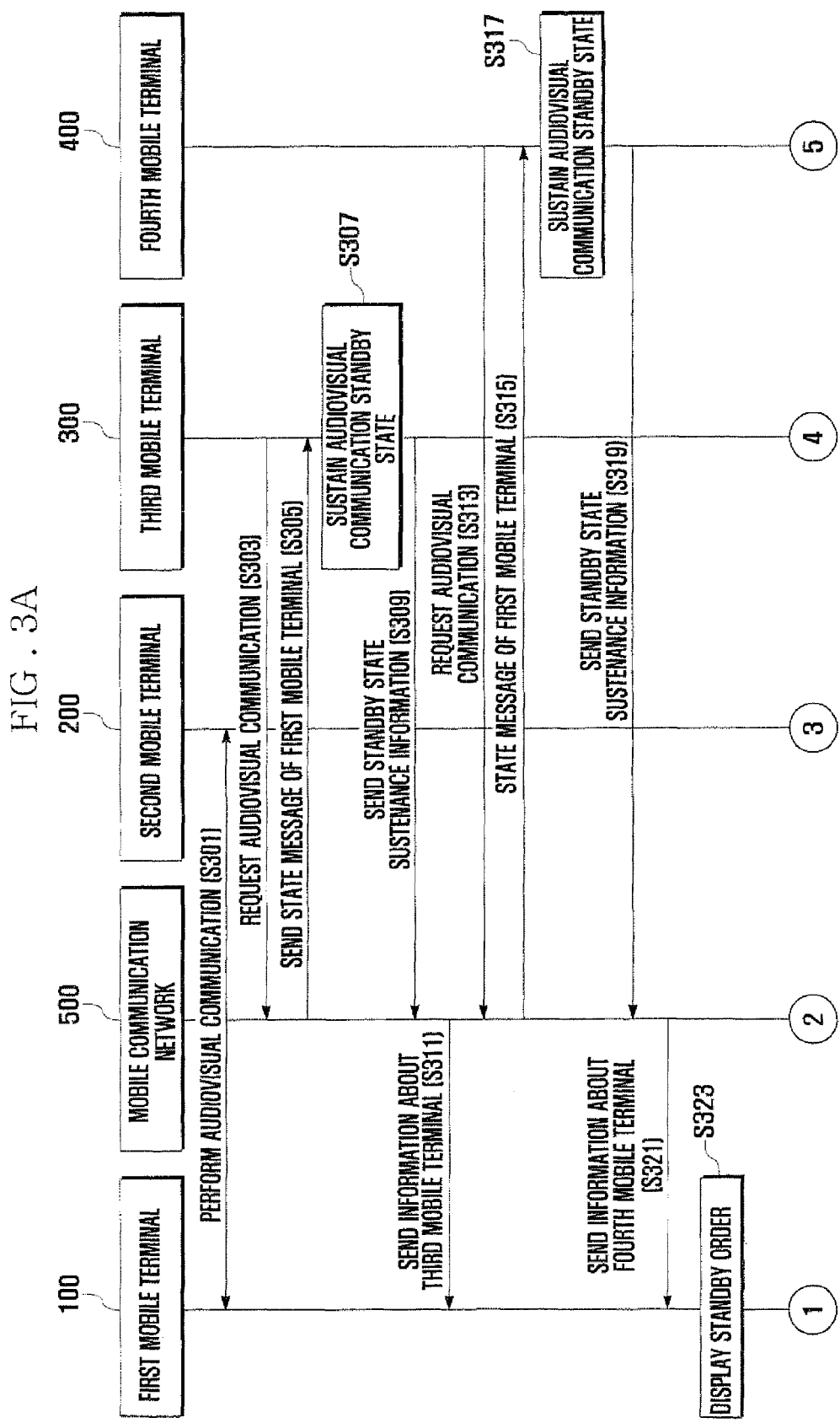

FIGS. 3A and 3B are message flow diagrams showing a method of changing a standby order of waiting mobile terminals in a mobile terminal according to another exemplary embodiment of the present invention.

Referring to FIGS. 3A and 3B, while the first mobile terminal 100 performs audiovisual communication with the second mobile terminal 100 (S301), the mobile communication network 500 receives a request for audiovisual communication from the third mobile terminal 300 (S303). At step S301, the first mobile terminal 100 is in an audiovisual communication state, the camera unit 107 of the first mobile terminal 100 acquires an image of a user of the first mobile terminal 100, the image processor 109 processes the user image, the display unit 111 displays the user image, and the microphone MIC and the speaker SPK are converted to an operation state.

The mobile communication network 500 sends a message regarding the state of the first mobile terminal 100 to the third mobile terminal 300 to notify the third terminal 300 that the first mobile terminal 100 is performing audiovisual communication (S305).

The third mobile terminal 300 determines whether to sustain an audiovisual communication standby state according to the message from the first mobile terminal 100 received through the mobile communication network 500 (S307). If the third mobile terminal 300 sustains an audiovisual communication standby state, the third mobile terminal 300 sends a standby state sustenance message to the mobile communication network 500 (S309).

Thereafter, the mobile communication network 500 sends information about the third mobile terminal 300 to the first mobile terminal 100 (S311) and forms a communication channel between the first mobile terminal 100 and the third mobile terminal 300. The information about the third mobile terminal 300 may include contact information and image data of the third mobile terminal 300.

The mobile communication network 500 receives a request for audiovisual communication from the fourth mobile terminal 400 (S313), and sends a message regarding the state of the first mobile terminal 100 to the fourth mobile terminal 400 to notify the fourth mobile terminal 400 that the first mobile terminal 100 is performing audiovisual communication (S315).

The fourth mobile terminal 400 determines whether to sustain an audiovisual communication standby state according to the message from the first mobile terminal 100 received through the mobile communication network 500 (S317). If the fourth mobile terminal 400 sustains an audiovisual communication standby state, the fourth mobile terminal 400 sends a standby state sustenance message to the mobile communication network 500 (S319).

Thereafter, the mobile communication network 500 sends information about the fourth mobile terminal 400 to the first mobile terminal 100 (S321) and forms a communication channel between the first mobile terminal 100 and the fourth mobile terminal 400. The information about the fourth mobile terminal 400 may include contact information and image data of the fourth mobile terminal 400.

The first mobile terminal 100 determines that a communication channel between the first mobile terminal 100 and the third mobile terminal 300 was formed at step S311, and that a communication channel between the first mobile terminal 100 and the fourth mobile terminal 400 is formed at step S321.

Thereafter, the first mobile terminal 100 sets and displays a standby order of the mobile terminals that have requested audiovisual communication by listing the mobile terminals in the order in which their requests were received (S323). In the present exemplary embodiment, because the third mobile terminal 300 requested audiovisual communication earlier than the fourth mobile terminal 400, the third mobile terminal 300 has the highest standby position.

When the first mobile terminal 100 wants to change the displayed standby order (S325), the first mobile terminal 100 sends a standby order change request message REQ_MSG through the mobile communication network 500 (S327). The request to change the standby order is input by selecting image data of the third mobile terminal 300 and the fourth mobile terminal 400 displayed in a change mode or a standby order.

The mobile communication network 500 receives the standby order change request message REQ_MSG and changes the standby order of the third mobile terminal 300 and the fourth mobile terminal 400 (S329).

The mobile communication network 500 temporarily stores the changed standby order (S331) and sends a standby order change completion message RES_MSG informing the first mobile terminal 100 of the standby order change of the third mobile terminal 300 and the fourth mobile terminal 400 (S333).

The first mobile terminal 100 changes and displays the standby order according to the standby order change completion message RES_MSG received from the mobile communication network 500 (S335).

Thereafter, when the first mobile terminal 100 ends audiovisual communication with the second mobile terminal 200 or converts a state of audiovisual communication with the second mobile terminal 200 to a standby state (S337), the mobile communication network 500 refers to the changed standby order that was temporarily stored at step 331 (S339) and enables the first mobile terminal 100 to perform audiovisual communication with the fourth mobile terminal 400, which has the highest standby position due to the change of the standby order (S341).

The mobile communication network 500 sends a message regarding the state of the first mobile terminal 100 to the third mobile terminal 300 to notify the third mobile terminal 300 that the first mobile terminal 100 is performing audiovisual communication (S343).

FIG. 4 is a flowchart showing a method of changing the standby order of waiting mobile terminals in a mobile terminal according to another exemplary embodiment of the present invention.

Referring to FIG. 4, the controller 105 controls the RF unit 101 to perform audiovisual communication with the second mobile terminal 200 (S401). The controller 105 displays moving picture data received in real time from the second mobile terminal 200 in the display unit 111. When the mobile terminal 100 receives a request for audiovisual communication from at least one mobile terminal while performing audiovisual communication (S403), the controller 105 determines whether the number of the mobile terminals requesting audiovisual communication is at least two (S405).

If there are at least two mobile terminals requesting audiovisual communication, the controller 105 sets a standby order according to the order in which the requests for audiovisual communication were received and displays the set standby order on the display unit 111 (S407). The controller 105 displays image data received from the mobile terminals requesting audiovisual communication or image data mapped to a phone number of the mobile terminals and stored in a phone book (not shown) on the display unit 111 in the order in which their audiovisual communication requests were received.

The controller 105 determines whether the set standby order has changed (S409). If the set standby order has not change, the process continues at step S419.

If the set standby order has changed, the controller 105 controls the RF unit 101 to send a message REQ_MSG requesting that the standby order of the mobile terminals (here, the third mobile terminal 300 and the fourth mobile terminal 400) be changed through the mobile communication network 500 (S411).

Thereafter, the controller 105 receives a standby order change completion message RES_MSG sent from the mobile communication network 500 through the RF unit 101 (S415). The controller 105 changes the standby order of the third mobile terminal 300 and the fourth mobile terminal 400 according to the received standby order change completion message RES_MSG and displays the changed standby order on the display unit 111 (S417).

The controller 105 determines whether the first mobile terminal 100 either ends audiovisual communication with the second mobile terminal 200 or converts a state of audiovisual communication with the second mobile terminal 200 to a standby state (S419). If the first mobile terminal 100 either ends audiovisual communication with the second mobile terminal 200 or converts a state of audiovisual communication with the second mobile terminal 200 to a standby state, the controller 105 determines whether mobile terminals waiting for audiovisual communication exist, and if mobile terminals waiting for audiovisual communication exist, the first mobile terminal 100 performs audiovisual communication with the mobile terminal having the highest standby position (S421). The first mobile terminal 100 may perform audiovisual communication with the fourth mobile terminal 400, whose standby order position is changed to the highest position at step S417, or with the third mobile terminal 300, which has the highest position in the standby order set at step S407.

If the number of the mobile terminals requesting audiovisual communication is not at least two at step 405, the controller 105 determines whether the first mobile terminal 100 has either ended audiovisual communication with the second mobile terminal 200 or converted a state of audiovisual communication with the second mobile terminal 200 to a standby state (S423). When the first mobile terminal 100 either ends audiovisual communication with the second mobile terminal 200 or converts a state of audiovisual communication with the second mobile terminal 200 to a standby state, the first mobile terminal 100 performs audiovisual communication with the mobile terminal requesting audiovisual communication (S425).

FIGS. 5A and 5B are message flow diagrams showing another method of changing a standby order of waiting mobile terminals in a mobile terminal according to another exemplary embodiment of the present invention.

Referring to FIGS. 5A and 5B, steps S501 to S523 of FIG. 5A are substantially the same as steps S301 to S323 of FIG. 3A and thus description thereof is omitted.

If the fourth mobile terminal 400 having a standby order position that is lower than that of the third mobile terminal 300 sends a standby order change request message REQ_MSG through the mobile communication network 500 (S525), the mobile communication network 500 sends the standby order change request message REQ_MSG to the first mobile terminal 100 (S527), and the mobile communication network 500 sends the standby order change request message REQ_MSG to the third mobile terminal 300 (S529). The standby order change request message REQ_MSG may be sent by the fourth mobile terminal 400 at the same time the fourth mobile terminal 400 sends an audiovisual communication request message to the mobile communication network 500 at step S513.

The first mobile terminal 100 approves the change of the standby order in response to the standby order change request message REQ_MSG (S531), and the third mobile terminal 300 approves the change of the standby order in response to the standby order change request message REQ_MSG (S533).

The first mobile terminal 100 then sends a standby order change approval message ACC_MSG to the mobile communication network 500 to confirm approval of the change of the standby order (S535), and the third mobile terminal 300 sends a standby order change approval message ACC_MSG to the mobile communication network 500 to confirm approval of the change of the standby order (S537).

The mobile communication network 500 changes the standby order of the third mobile terminal 300 and the fourth mobile terminal 400 according to the standby order change approval message ACC_MSG received from the first mobile terminal 100 at step S535 and from the third mobile terminal 300 at step S537 (S539).

The mobile communication network 500 temporarily stores a changed standby order (S541) and sends a standby order change completion message RES_MSG to the first mobile terminal 100 (S543), the third mobile terminal 300 (S545), and the fourth mobile terminal 400 (S547).

The first mobile terminal 100 changes and displays the standby order set at the third mobile terminal 300 and the fourth mobile terminal 400 according to the standby order change completion message RES_MSG received from the mobile communication network 500 (S549).

Thereafter, when the first mobile terminal 100 ends audiovisual communication with the second mobile terminal 200 or converts a state of audiovisual communication with the second mobile terminal 200 to a standby state (S551), the mobile communication network 500 refers to the changed standby order temporarily stored at step S541 (S553) and enables the first mobile terminal 100 to perform audiovisual communication with the fourth mobile terminal 400, which has the highest standby position due to the change of the standby order (S555).

The mobile communication network 500 sends a message regarding the state of the first mobile terminal 100 to the third mobile terminal 300 to notify the third mobile terminal 300 that the first mobile terminal 100 is performing audiovisual communication (S557).

Another method of changing a standby order of waiting mobile terminals according to another exemplary embodiment of the present invention (not shown in the Figures) is described as follows.

When the mobile communication network 500 receives a standby order change request message REQ_MSG from the fourth mobile terminal 400, the mobile communication network 500 sends the standby order change request message REQ_MSG to the first mobile terminal 100.

Thereafter, if the first mobile terminal 100 approves the change of the standby order in response to the standby order change request message REQ_MSG, the first mobile terminal 100 sends a standby order change approval message ACC_MSG confirming the approval to the mobile communication network 500. When the mobile communication network 500 receives the standby order change approval message ACC_MSG, the mobile communication network 500 changes the standby order accordingly. The mobile communication network 500 temporarily stores the changed standby order and sends a standby order change completion message RES_MSG to the first mobile terminal 100.

Another method of changing a standby order of waiting mobile terminals according to another exemplary embodiment of the present invention (not shown in the Figures) is described as follows.

When the mobile communication network 500 receives a standby order change request message REQ_MSG from the fourth mobile terminal 400, the mobile communication network 500 sends the standby order change request message REQ_MSG to the first mobile terminal 100 and the third mobile terminal 300. If the first mobile terminal 100 does not approve the standby order change request in response to the standby order change request message REQ_MSG, the first mobile terminal 100 sends a standby order change non-approval message N_ACC_MSG to the mobile communication network 500. If the third mobile terminal 300 does not approve the request for changing the standby order in response to the standby order change request message REQ_MSG, the third mobile terminal 300 sends a standby order change non-approval message N_ACC_MSG to the mobile communication network 500.

When at least one of the first mobile terminal 100 and the third mobile terminal 300 sends a standby order change non-approval message N_ACC_MSG to the mobile communication network 500, the mobile communication network 500 does not change the standby order and sends the standby order change non-approval message N_ACC_MSG to the first mobile terminal 100, the third mobile terminal 300, and the fourth mobile terminal 400.

Further, if the first mobile terminal 100 approves the change of the standby order and the third mobile terminal 300 does not approve the change of the standby order in response to the standby order change request message REQ_MSG, upon receiving the standby order change non-approval message N_ACC_MSG from the mobile communication network 500 notifying it that the standby order is not changed because the third mobile terminal 300 does not approve the change of the standby order, the first mobile terminal 100 may send a standby order change request message REQ_MSG to the mobile communication network 500 and may thereby forcibly change the standby order of the third mobile terminal 300 and the fourth mobile terminal 400.

Figure 6:
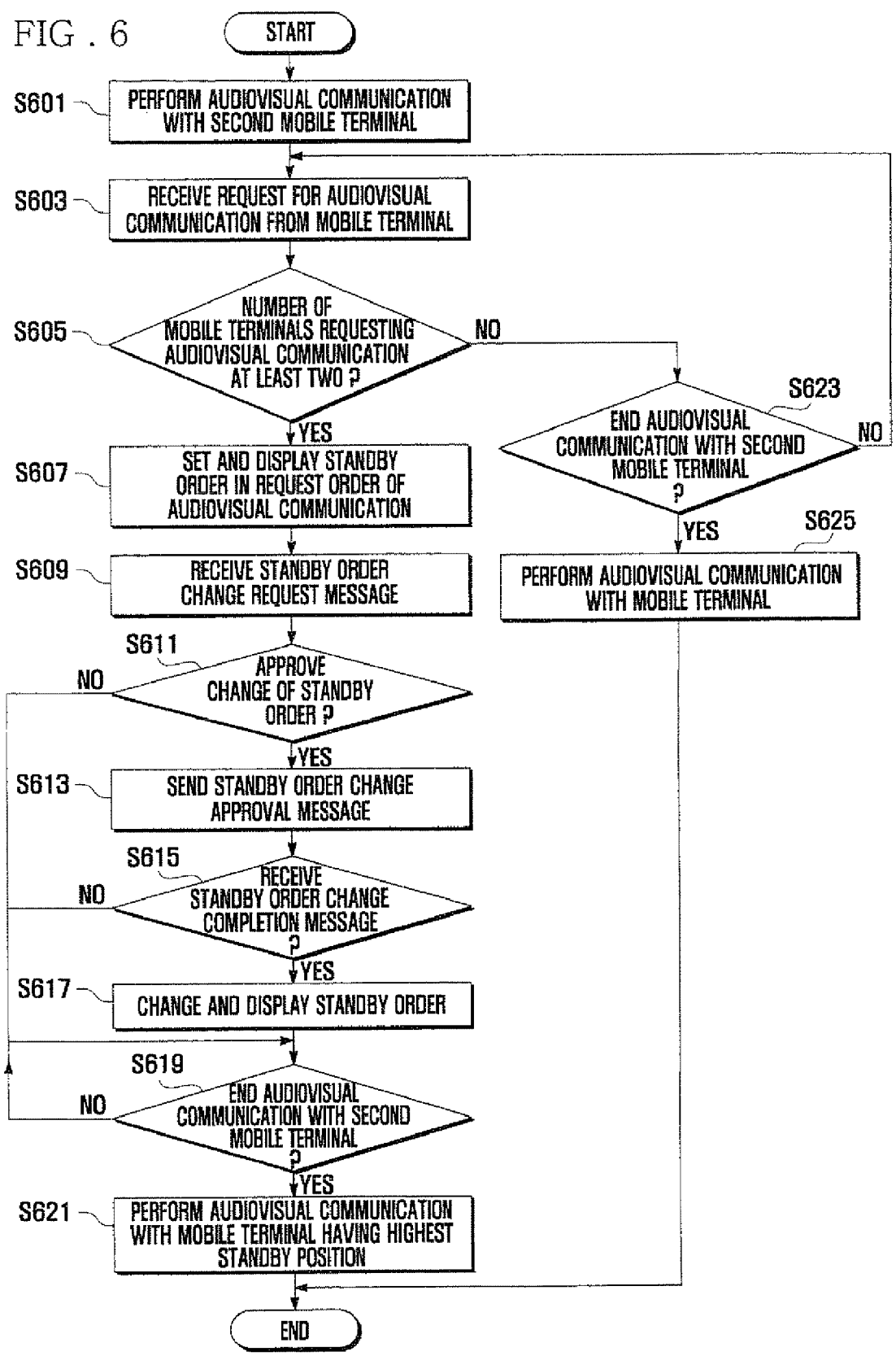
FIG. 6 is a flowchart showing another method of changing a standby order of waiting mobile terminals in a mobile terminal according to another exemplary embodiment of the present invention.

FIG. 6 is a flowchart showing another method of changing the standby order of waiting mobile terminals in a mobile terminal according to another exemplary embodiment of the present invention.

Referring to FIG. 6, the controller 105 controls the RF unit 101 so that the first mobile terminal 100 performs audiovisual communication with the second mobile terminal 200 (S601). The controller 105 displays moving picture data received in real time from the second mobile terminal 200 in the display unit 111.

When the controller 105 receives a request for audiovisual communication from at least one mobile terminal while performing audiovisual communication (S603), the controller 105 determines whether the number of the mobile terminals requesting audiovisual communication is at least two (S605).

If there are at least two mobile terminals requesting audiovisual communication, the controller 105 sets a standby order in an audiovisual communication request order and displays the order in the display unit 111 (S607). The controller 105 displays image data received from the mobile terminals requesting audiovisual communication or image data mapped to a phone number of the mobile terminals and stored in a phone book (not shown) on the display unit 111 in the order in which their audiovisual communication requests were received.

If the controller 105 receives a standby order change request message REQ_MSG from the fourth mobile terminal 400 (S609), the controller 105 determines whether the mobile terminal 100 approves the change of the standby order in response to the standby order change request message (S611). If the mobile terminal 100 does not approve the change of the standby order, the process continues at step S619.

If the mobile terminal 100 approves the change of the standby order, the controller 105 sends a standby order change approval message ACC_MSG to the mobile communication network 500 (S613).

The controller 105 determines whether the mobile terminal 100 receives a standby order change completion message RES_MSG from the mobile communication network 500 (S615). If the mobile terminal 100 does not receive a standby order change completion message RES_MSG from the mobile communication network 500, the process continues at step S619. If the mobile terminal 100 receives a standby order change completion message RES_MSG from the mobile communication network 500, the controller 105 changes the standby order according to the received standby order change completion message RES_MSG and displays the changed standby order in the display unit 111 (S617).

The controller 105 determines whether the first mobile terminal 100 has either ended audiovisual communication with the second mobile terminal 200 or converted a state of audiovisual communication with the second mobile terminal 200 to a standby state (S619). When the first mobile terminal 100 either ends audiovisual communication with the second mobile terminal 200 or converts a state of audiovisual communication with the second mobile terminal 200 to a standby state, the controller 105 determines whether mobile terminals waiting for audiovisual communication exist, and if mobile terminals waiting for audiovisual communication exist, the first mobile terminal 100 performs audiovisual communication with the mobile terminal having the highest standby position (S621). For example, the first mobile terminal 100 may perform audiovisual communication with the fourth mobile terminal 400, whose standby order position has changed to the highest position at step S617, or with the third mobile terminal 300 having the highest position in the standby order set at step S607.

If the number of the mobile terminals requesting audiovisual communication is not at least two at step S605, the controller 105 determines whether the first mobile terminal 100 either ends audiovisual communication with the second mobile terminal 200 or converts a state of audiovisual communication with the second mobile terminal 200 to a standby state (S623). If the first mobile terminal 100 either ends audiovisual communication with the second mobile terminal 200 or converts a state of audiovisual communication with the second mobile terminal 200 to a standby state, the first mobile terminal 100 performs audiovisual communication with the mobile terminal requesting audiovisual communication (S625).

Figure 7:
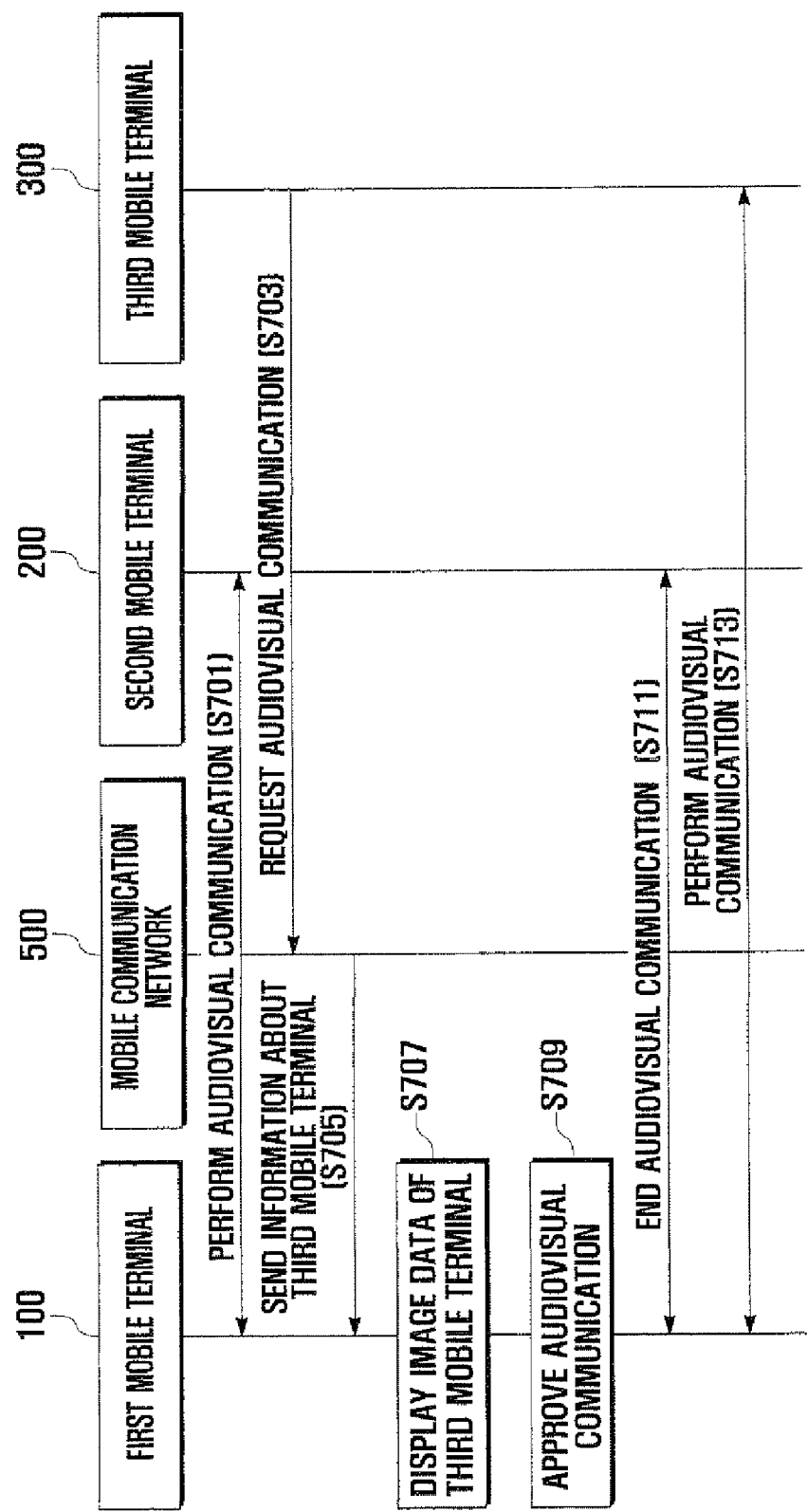
FIG. 7 is a message flow diagram showing another method of performing audiovisual communication with waiting mobile terminals in a mobile terminal according to another exemplary embodiment of the present invention.

FIG. 7 is a message flow diagram showing another method of performing audiovisual communication with waiting mobile terminals in a mobile terminal according to another exemplary embodiment of the present invention.

Referring to FIG. 7, while the first mobile terminal 100 performs audiovisual communication with the second mobile terminal 200 through the mobile communication network 500 (S701), the mobile communication network 500 receives a request for audiovisual communication with the first mobile terminal 100 from the third mobile terminal 300 (S703).

The mobile communication network 500 forms a communication channel between the first mobile terminal 100 and the third mobile terminal 300 and sends information about the third mobile terminal 300 together with the request for audiovisual communication to the first mobile terminal 100 (S705). The information about the third mobile terminal 300 may be subscriber information (e.g. a phone number) of the third mobile terminal 300 and/or information including image data of the third mobile terminal 300.

The first mobile terminal 100 displays the image data received from the third mobile terminal 300 (S707). The first mobile terminal 100 may further display a message (e.g. a pop-up window) to approve the connection for audiovisual communication with the third mobile terminal 300.

If the first mobile terminal 100 approves audiovisual communication with the third mobile terminal 300 (S709), the mobile communication network 500 ends audiovisual communication between the first mobile terminal 100 and the second mobile terminal 200 or converts a state of audiovisual communication between the first mobile terminal 100 and the second mobile terminal 200 to a standby state (S711). Thereafter, the mobile communication network 500 enables audiovisual communication between the first mobile terminal 100 and third mobile terminal 300 (S713).

As described above, according to the present invention, by changing the standby order of at least two mobile terminals requesting audiovisual communication while a first mobile terminal performs audiovisual communication with a second mobile terminal, audiovisual communication may be performed with a selected mobile terminal requesting audiovisual communication, which may provide greater convenience to a user of the first mobile terminal.

In addition, by changing a standby order according to a request for changing the standby order received from a mobile terminal having a lower standby position among at least two mobile terminals requesting audiovisual communication while the first mobile terminal performs audiovisual communication with the second mobile terminal, audiovisual communication may be performed with a selected mobile terminal requesting audiovisual communication, which may provide greater convenience to a user of the mobile terminal in a standby state having the lower standby position.

In addition, by displaying information about a mobile terminal requesting audiovisual communication while the first mobile terminal performs audiovisual communication with the second mobile terminal, the mobile terminal in a standby state may be easily checked by the user.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for changing a standby order in a mobile communication system, comprising:
   displaying a standby order of a plurality of mobile terminals, according to the order in which the audiovisual communication requests of the plurality of mobile terminals were received, when a first mobile terminal receives requests for audiovisual communication from the plurality of mobile terminals while the first mobile terminal performs audiovisual communication with a second mobile terminal;
   sending a standby order change request message from the first mobile terminal to a mobile communication network when the first mobile terminal receives a request to change the standby order;
   changing the standby order at the first mobile terminal when the first mobile terminal receives a standby order change completion message from the mobile communication network corresponding to the standby order change request message; and
   displaying the changed standby order.

2. The method of claim 1, further comprising:
   changing the standby order at the mobile communication network in response to the standby order change request message sent by the first mobile terminal.

3. The method of claim 2, further comprising sending the changed standby order to the first mobile terminal through the mobile communication network.

4. The method of claim 1, further comprising performing audiovisual communication with another mobile terminal according to the standby order when the first mobile terminal ends audiovisual communication with the second mobile terminal or converts a state of audiovisual communication with the second mobile terminal to a standby state.

5. A method for changing a standby order in a mobile communication system, comprising:
   displaying a standby order of a plurality of mobile terminals according to the order in which audiovisual communication request orders of the plurality of mobile terminals were received, when a first mobile terminal receives requests for audiovisual communication from the plurality of mobile terminals while the first mobile terminal performs audiovisual communication with a second mobile terminal;
   determining whether the first mobile terminal approves a requested change of the standby order when the first mobile terminal receives a standby order change request message of a third mobile terminal of the plurality of mobile terminals;
   changing the standby order if the first mobile terminal approves the requested change of the standby order; and
   displaying the changed standby order.

6. The method of claim 5, wherein determining whether the first mobile terminal approves the requested change of the standby order comprises:
   receiving the standby order change request message of the third mobile terminal from a mobile communication network; and
   sending a standby order change approval message to the mobile communication network when the standby order change request is approved in response to the received standby order change request message.

7. The method of claim 6, wherein changing the standby order comprises:
   receiving a standby order change completion message from the mobile communication network; and
   changing the standby order according to the standby order change completion message.

8. The method of claim 6, wherein receiving the standby order change request message of the third mobile terminal comprises:
   sending a standby order change request message from the third mobile terminal to the mobile communication network; and
   receiving the standby order change request message of the third mobile terminal from the mobile communication network in the first mobile terminal.

9. The method of claim 8, wherein changing the standby order comprises:
   receiving the standby order change approval message sent from the first mobile terminal in the mobile communication network; and
   changing the standby order.

10. The method of claim 9, wherein changing the standby order further comprises sending a standby order change completion message from the mobile communication network to the first mobile terminal.

11. The method of claim 8, wherein the standby order change request message sent from the third mobile terminal is sent by the mobile communication network to the first mobile terminal and to a fourth mobile terminal of the plurality of mobile terminals.

12. The method of claim 11, wherein changing the standby order comprises:
   receiving response messages to the standby order change request message from the first mobile terminal and from the fourth mobile terminal in the communication network; and
   changing the standby order.

13. The method of claim 12, wherein the mobile communication network changes the standby order according to the response messages if the response messages received from the first mobile terminal and from the fourth mobile terminal are identical.

14. The method of claim 12, wherein the mobile communication network changes the standby order according to the response message of the first mobile terminal if the response messages received from the first mobile terminal and from the fourth mobile terminal are not identical.

15. The method of claim 14, wherein changing the standby order further comprises sending a standby order change completion message from the mobile communication network to the first mobile terminal, the third mobile terminal, and the fourth mobile terminal.

16. The method of claim 12, wherein the response message to the standby order change request message is one of a standby order change approval message and a standby order change non-approval message.

17. The method of claim 5, further comprising performing audiovisual communication with a mobile terminal according to the standby order when the first mobile terminal ends audiovisual communication with the second mobile terminal or converts a state of audiovisual communication with the second mobile terminal to a standby state.

* * * * *